(12) United States Patent
Endler (10) Patent No.: US 11,284,043 B2
(45) Date of Patent: Mar. 22, 2022

(54) DATA TRANSMISSION SYSTEM AND METHOD IN PIPE INSPECTION AND/OR MAINTENANCE SYSTEMS

(71) Applicant: iPEK International GmbH, Sulzberg (DE)

(72) Inventor: Hannes Endler, Kempten (DE)

(73) Assignee: iPEK International GmbH, Sulzberg (DE)

( * ) Notice: Subject to any disclaimer, the term of this patent is extended or adjusted under 35 U.S.C. 154(b) by 0 days.

(21) Appl. No.: 16/837,135

(22) Filed: Apr. 1, 2020

(65) Prior Publication Data
US 2020/0322576 A1 Oct. 8, 2020

(30) Foreign Application Priority Data
Apr. 2, 2019 (DE) ...................... 10 2019 108 614.0

(51) Int. Cl.
*H04N 9/47* (2006.01)
*H04N 7/18* (2006.01)
(Continued)

(52) U.S. Cl.
CPC .............. *H04N 7/185* (2013.01); *F16L 55/28* (2013.01); *H04N 5/2252* (2013.01); *F16L 2101/30* (2013.01)

(58) Field of Classification Search
CPC ......... H04N 2005/2255; H04N 5/2252; H04N 5/2251; H04N 5/2259; H04N 5/23293;
(Continued)

(56) References Cited

U.S. PATENT DOCUMENTS

| 2014/0204197 A1* | 7/2014 | Olsson | G03B 37/005 |
| | | | 348/84 |
| 2017/0163940 A1 | 6/2017 | Olsson | |
| 2020/0294401 A1* | 9/2020 | Kerecsen | G05D 1/0287 |

FOREIGN PATENT DOCUMENTS

| DE | 202014105998 U1 | 9/2015 | |
| DE | 202015100552 U1 * | 5/2016 | ............ G08C 19/00 |
| DE | 202017104428 U1 | 10/2017 | |

OTHER PUBLICATIONS

Extended European Search report and written opinion issued by the European Patent Office for corresponding European Patent Application No. 20167673.1, dated Aug. 21, 2020, with English translation attached.

* cited by examiner

*Primary Examiner* — Masum Billah
(74) *Attorney, Agent, or Firm* — Myers Wolin, LLC (57) ABSTRACT

A pipe inspection and/or maintenance system is provided, having a control device, an image recording device and a feed device. The image recording device can be mechanically coupled to the feed device, and the image recording device and the feed device are operatively connected to one another via a first communication link. The feed device and the control device are operatively connected to one another via a second communication connection. The feed device has a processing unit which is operatively connected to the first communication connection and to the second communication connection, and the processing unit is adapted to receive image data from the image recording device by way of the first communication link, to process the received image data, and to transmit the processed image data to the control device by way of the second communication link. A corresponding method is also provided.

5 Claims, 4 Drawing Sheets

(51) Int. Cl.
*F16L 55/28* (2006.01)
*H04N 5/225* (2006.01)
*F16L 101/30* (2006.01)

(58) Field of Classification Search
CPC .... H04N 5/345; H04N 5/2253; H04N 5/2258; H04N 5/232; H04N 5/23206; H04N 5/232939; G03B 37/005; G03B 17/561; G02B 23/2484; H02G 11/02
USPC .......................................................... 348/84
See application file for complete search history.

DATA TRANSMISSION SYSTEM AND METHOD IN PIPE INSPECTION AND/OR MAINTENANCE SYSTEMS

CROSS REFERENCE TO RELATED APPLICATIONS

This application claims priority to German Patent Application No. 10 2019 108 614.0, filed Apr. 2, 2019, the contents of which are incorporated by reference herein.

TECHNICAL FIELD

The invention relates to a pipe inspection and/or maintenance system for inspection and/or maintenance of a pipe, comprising a control device, an image recording device and a feed device, the image and/or video data recorded by the image recording device being transmitted to the control device, and a method for data transmission in a pipe inspection and/or maintenance system.

BACKGROUND

To carry out a pipe inspection and/or maintenance of pipes and channels, it is known to use so-called pipe inspection and/or maintenance systems which can be introduced into the respective pipe/channel and moved therein. Both pipe inspection and maintenance systems can have cameras with which images or videos can be recorded during the inspection or during maintenance.

The recorded images or videos must be transferred to a control device outside the pipe, where they can be evaluated by staff. Both analog and digital camera systems can be used to record the pictures and videos.

The images or videos recorded by the cameras are transmitted to the control device via a coaxial line or a fiber optic line. These lines are usually located within a cable in which further lines for the power supply of the camera can be present.

Such cameras can be fixedly mounted on a trolley or on a fiber glass rod, the lines provided for the transmission of the images or videos being led from the camera through the trolley or through the fiber glass rod to the control device. A processing device required for data transmission is arranged in the camera housing or in the camera itself. This has the disadvantage that the processing device of the camera must be matched to the control device (or vice versa) so that the control device can correctly receive and evaluate the image or video data. In addition, an exchange of the camera is not always possible due to the fact that the camera is fixedly mounted on the trolley or on the fiber glass rod. If an exchange of the camera is possible, this or the processing device of the camera must be adapted to the capabilities of the control device. Otherwise the control device would also have to be replaced.

SUMMARY

It is therefore an object of the present invention to provide a pipe inspection and/or maintenance system of the type mentioned at the outset and a corresponding method for data transmission in a pipe inspection and/or maintenance system which allow simple and flexible exchange of camera systems and more flexible transmission of the image and/or enable video data.

This object may be achieved with a pipe inspection and/or maintenance system and a method for data transmission in a pipe inspection and/or maintenance system according to the claims.

Provided is thus a pipe inspection and/or maintenance system for inspection and/or maintenance of a pipe, comprising a control device, an image recording device and a feed device, wherein
the image recording means can be mechanically coupled to the feed device, preferably detachably, in order to move the image pickup with the feed device in the tube,
the image recording device and the feed device are operatively connected to each other via a first communication link,
the feed device and the control device are operatively connected to one another via a second communication link,
the feed device has a processing unit which is operatively connected to the first communication link and to the second communication link, the processing unit being adapted
to receive image data of the image recording device via the first communication link,
to process the received image data, and
to transmit the processed image data to the control device via the second communication link.

Because the processing unit is arranged in the feed device, for example in a trolley or a fiber glass rod, the complete processing of the image or video data recorded by the image recording device can be handled in the feed device. The processing unit or the feed device can have different physical interfaces for connecting the image recording device, the processing unit, depending on which interface the image recording device is connected to, correspondingly processing the image or video data received by the image recording device, and transmitting it to the control device. As a result, any image recording devices can be coupled to the feed device. Different physical interfaces can also be provided for the transmission of the image data processed by the processing unit to the control device, so that the image data can be transmitted, for example, via a copper cable (for example via a twisted pair or coaxial cable, or via a fiber optic cable).

However, not only different image recording devices can be connected to the processing unit. It is also advantageous that several, even different, image recording devices can be connected to the processing unit at the same time, for example a forward-facing and a rear-facing camera.

Since the transmission path between the image recording device and the feed device is usually very short and the transmission path between the feed device and the control device is usually very long, transmission media optimized for short transmission paths can be used for the data transmission between the image recording device and the feed device and media optimized for long data transmission paths can be used between for the data transmission between the feed device and the control device.

Another advantage of providing the processing device in the feed unit is that the camera or camera systems can be provided significantly more cheaply and with considerably less complexity, since corresponding processing units can be dispensed with in the camera systems. In addition, the space available in a camera housing, particularly in the case of cameras used in pipe inspection, is severely limited, which can lead to a high level of complexity when installing the processing device in the camera housing. Standard components for realizing the processing device within the camera housing must therefore usually be dispensed with, whereas such standard components can be used when the processing device is provided in the feed unit.

Due to their arrangement on the feed unit (usually on the front of the trolley and unprotected from mechanical influences), camera units are more sensitive to mechanical influences. It is advantageous here if the camera unit is designed to be less complex in the event of servicing.

The signal processing device and/or the signal transmission device can be implemented as a digital signal processor (DSP) or as an ASIC.

The processing unit can have at least one signal processing device and one signal transmission device operatively connected thereto, wherein
the signal processing device is adapted to receive the image data from the image recording device, to process the received image data and to transmit the processed image data to the signal transmission device, and
the signal transmission device is adapted to transmit the image data received by the signal processing device to the control device.

It is advantageous if the processing of the image data received by the signal processing device comprises
digitization of analog image data received and compression of the digitized image data, or
compression of digitally received image data,
the signal processing device for compressing the image data having a compression unit.

High-quality compression units (which can be designed, for example, as DSP or ASIC) usually have a high power loss, so that it is advantageous to arrange the signal processing device in the feed unit, for example in a trolley. Due to the large size of the housing of the feed unit, the power loss or heat loss can be dissipated much better than would be possible in a small camera housing.

High-resolution videos require a high bandwidth for transmission, which is why high demands are placed on the transmission path (e.g. cables). Cables that meet the necessary conditions are usually very heavy and have a large outside diameter. Due to the weight of the cable, only short inspection distances are possible because the trolley has to pull the cable behind it. By compressing the high-resolution video data in the signal processing device of the feed unit, the transmission bandwidth required for data transmission can be considerably reduced. At the same time, the demands placed on the cables can be reduced, so that simpler and, above all, lighter cables can be used. The effective inspection routes can thus be significantly lengthened.

The second communication link can be a copper cable or a fiber optic cable, at least in sections.

It is advantageous if the signal transmission device is adapted to transmit the digitized and compressed image data to the control device in accordance with a predetermined transmission standard, in particular BroadR-Reach, wherein the signal processing device or the signal transmission device are further adapted to process the digitized and compressed image data in accordance with the predetermined transmission standard.

The control device can have a signal receiving device and a display/operating unit, the signal receiving device being coupled and adapted to the second communication link
to receive the image data from the signal transmission device, and
to process the received image data and prepare it for display on the display/operating unit.

The control device can also have a cable drum on which the signal receiving device is arranged.

By arranging the signal receiving device on the cable drum, any display/operating units can be used in the pipe inspection and/or maintenance system. On the one hand, the signal receiving device can provide different physical interfaces for connecting display/operating units. On the other hand, the signal receiving device can have different physical interfaces for coupling the signal receiving device to the processing unit of the feed device. The display/operating can thus be provided more cost-effectively and with less complexity.

Also provided is a method for data transmission in a pipe inspection and/or maintenance system, the pipe inspection and/or maintenance system having at least one control device, an image recording device and a feed device, wherein
image data recorded by the image recording device are transmitted from the image recording device to the feed device via a first communication link,
a processing unit of the feed device
processes the received image data, and
transmits the processed image data to the control device via a second communication link,
the image recording device and the feed device being releasably coupled to one another.

It is advantageous if
a signal processing device of the processing unit receives the image data of the image recording device, processes the received image data and transmits the processed image data to a signal transmission device of the processing unit, and
the signal transmission device transmits the image data received from the signal processing device to the control device,
wherein during processing of the image data received by the signal processing device
received analog image data is digitized and the digitized image data is compressed, or
received digital image data is compressed.

It can also be advantageous if the signal transmission device transmits the digitized and compressed image data to the control device in accordance with a predetermined transmission standard, in particular BroadR-Reach, the signal processing device or the signal transmission device processing the digitized and compressed image data in accordance with the predetermined transmission standard.

Furthermore, it can be advantageous if a signal receiving device of the control device receives the image data from the signal transmission device and processes the received image data for display on a display/operating unit control device.

BRIEF DESCRIPTION OF THE DRAWINGS

Further details and features of the invention as well as specific, particularly advantageous exemplary embodiments of the invention result from the following description in conjunction with the drawing. In the drawings.

DETAILED DESCRIPTION

Figure 1:
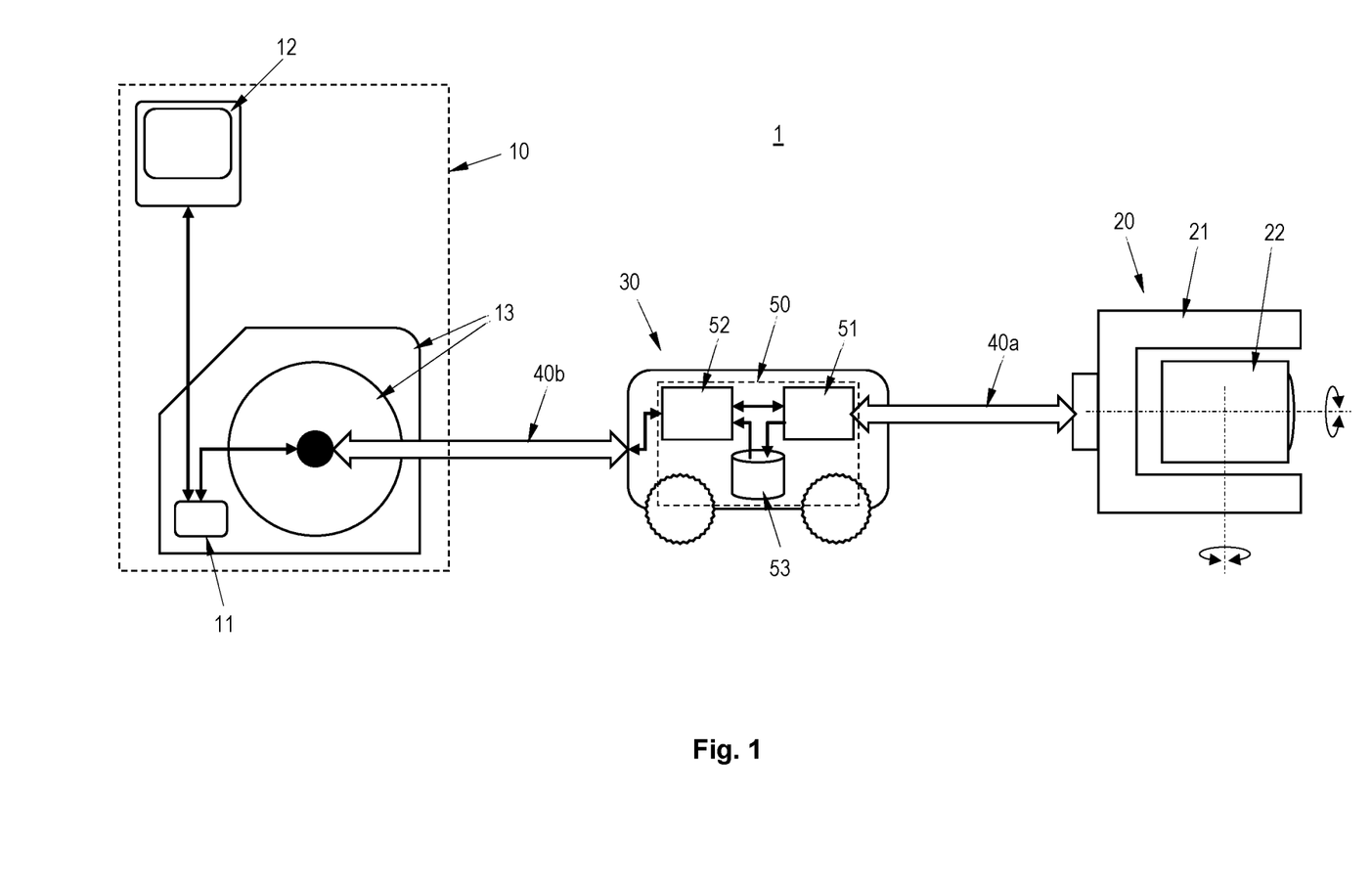
FIG. 1 shows a first embodiment of a pipe inspection and/or maintenance system according to the invention.

FIG. 1 shows a first exemplary embodiment of a pipe inspection and/or maintenance system 1 according to the invention, which has a control device 10, an image recording device 20 and a feed device 30.

The feed device 30 is designed here as a trolley. Trolleys of pipe inspection and/or maintenance systems are known from the prior art and are not described here except for the features essential to understanding the embodiments described herein.

A processing unit 50 is arranged in the trolley 30, which has a signal processing device 51, a signal transmission device 52 and optionally a storage device 53. The processing unit 50 or the signal processing device 51 is coupled to the image recording device 20 via a first communication link 40a. The image recording device 20 can be a photo camera, a video camera or another camera system, which provide video and/or image data in digital or analog form. The image recording device can have a housing 21 in which the camera system is arranged. The image recording device 20 or the camera system 22 can be rotatable about a longitudinal axis and/or about a transverse axis. Alternatively or additionally, the image recording device 20 can also be pivotable about a pivot axis.

The image and/or video data provided by the camera system 22 are transmitted in an unprocessed form via the first communication link 40a to the processing unit 50 or to the signal processing device 51 of the feed device 30. Depending on whether the camera system 22 provides analog or digital image data, corresponding transmission media are used for the first communication link 40a.

The processing unit 50 or the signal processing device 51 receives the digital or analog image or video data, processes this data and transmits the processed data to the control device 10 with the aid of a signal transmission device 52 via a second communication link 40b.

The signal processing device 51 of the feed device 30 digitizes the received image or video data, provided that this is provided in analog form by the camera system 22, and prepares the digitized data for transmission by the signal transmission device 52. It is advantageous if the image data is compressed by the signal processing device 51 before the transmission to the control device 10 or before the preparation for the transmission. If the video or image data is already provided in digital form by the camera system 22, it only has to be prepared for transmission by the signal transmission device 52 and, if necessary, compressed beforehand.

Because the entire processing and preparation of the image or video data is carried out by the processing unit 50 of the feed device 30, such processing units in the image recording device 20 or in the camera system 22 can be dispensed with. As a result, different image recording devices can be provided in a significantly cheaper and less complex manner. So that different camera systems or image recording devices with different physical interfaces can be connected to the processing unit 50, it is advantageous in one embodiment of the invention if the processing unit 50 or the signal processing device 51 provides different physical interfaces. Depending on which of these interfaces the signal processing device 51 receives the image or video data of the image recording device 20, the data can be processed differently. Depending on the image recording device 20 used, different transmission means (for example coaxial cable, twisted pair cable, fiber optic cable or other transmission media) can be used for the first communication link 40a.

In one embodiment of the invention, the data processed and compressed by the signal processing device 51 can be transmitted directly to the signal transmission device 52 for transmission to the control device 10.

In an alternative embodiment, the data processed and compressed by the signal processing device 51 can be stored in a storage device 53 of the processing unit 50. The storage of the data in the storage device 53 is advantageous if the transmission between the signal transmission device 52 and the control device 10 is disturbed or interrupted, for example due to damage to the cable of the second communication link 40b. This ensures that no video or image data is lost.

However, it is also possible for the signal processing device 51 to transmit the processed and optionally compressed data both to the signal transmission device 52 and to the storage device 53. This ensures that the entire data provided by the image recording device 20 are stored independently of a successful transmission to the control device 10. The data stored in the storage device 53 can then optionally be read out from the storage device 53 after the inspection or maintenance process. The reading out of the data stored in the storage device 53 can then again be carried out via the signal transmission device 52.

In the embodiment of the inspection system 1 according to the invention shown in FIG. 1, the control device 10 comprises a cable drum 13 and a display/operating unit 12 coupled to the cable drum 13. The cable drum 13 serves for winding or unwinding a cable which forms the second communication link 40b. A signal receiving device 11 is arranged on the cable drum 13, which device is coupled to the cable wound on the cable drum 13 and which receives the image or video data transmitted via the second communication link 40b. On the other hand, the signal receiving device 11 is coupled to the display/operating unit 12. The image or video data received by the signal receiving device 11 can be processed by the latter before being transmitted to the display/operating unit 12, for example converted into a format suitable for the display unit 12.

In one embodiment of the invention, the signal receiving device 11 can have several different connections, so that different display/operating units 12 can be connected. As a result, the greatest possible degree of flexibility is also achieved with regard to the usability of different display/operating units 12.

The second communication link 40b can be, for example, a copper cable, for example a twisted pair or a coaxial cable, or a fiber optic cable. The BroadR-Reach protocol, for example, can be used for the transmission of the data from the feed device 30 via the second communication link 40b to the control device 10, the signal transmission device 52 being adapted to the processing unit 50 of the feed device 30, to transmit the image or video data in this format or in accordance with this protocol.

In one embodiment of the invention, the feed device 30 can have sensors or the feed device 30 can be coupled to sensors. The sensor data of these sensors can also be fed to the signal processing device 51 of the processing unit 50. The signal processing device 51 can prepare the sensor data accordingly and make it available to the signal transmission device 52 for transmission to the control device 10. Depending on the transmission protocol used, this sensor data can then be transmitted in parallel to the control device 10 via the second communication link 40b.

In a further embodiment of the invention, it is provided that the feed device 30 is coupled to a plurality of image recording devices 20. For example, a trolley 30 can be coupled to two image recording devices 20, one image recording device being oriented forwards and the other image recording device being oriented rearwards. The signal processing device 51 is adapted here to process or prepare the video or image data of all image recording devices and to make it available to the control device 10 of the signal transmission device 52.

In one embodiment of the invention, the first communication link 40a and the second communication link 40b are designed bidirectionally, that is to say a bidirectional data transmission can be carried out via these two communication links 40a, 40b. On the one hand, the feed device 30, for example the trolley, and/or the image recording device 20 can be controlled via the display/operating unit 12 of the control device 10. Control data of the operating unit 12 are coupled into the second communication link 40b via the signal receiving device 11 of the control device 10. The signal transmission device 52 of the processing unit 50 is adapted to receive the control data and to supply it to the signal processing device 51. The signal processing device 51 can evaluate the received control data and supply it to the components of the trolley to be controlled. If the control data is provided for controlling the image recording device 20, this data can be transmitted from the signal processing device 51 to the image recording device 20 via the first communication link 40a.

It is advantageous if the control data comprise information that indicates the component for which the respective control data is intended. It is also advantageous here if control data of a plurality of components to be controlled can be transmitted in parallel to the feed device 30 via the second communication link 40b.

Figure 2:
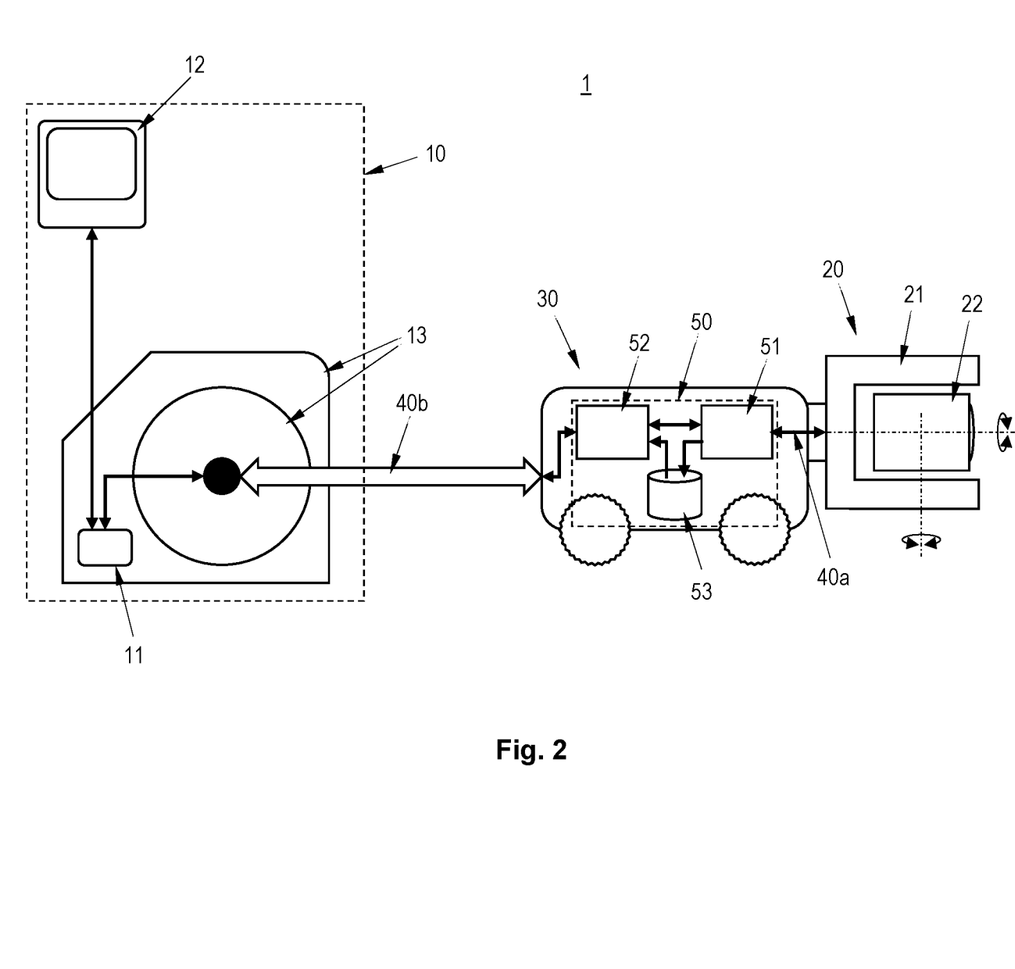
FIG. 2 shows a second embodiment of a pipe inspection and/or maintenance system according to the invention.

FIG. 2 shows a further embodiment of a pipe inspection and/or maintenance system 1 according to the invention. While in the system shown in FIG. 1 the image recording device 20 is attached to the trolley 30, for example via a lifting arm, and the processing unit 50 of the trolley is coupled to the image recording device via a cable which forms the first communication link 40a, in the case of the embodiment of the inspection system 1 shown in FIG. 2, the image recording device 20 is arranged directly on the trolley 30. As needed, the entire image recording device 20 can be arranged on the trolley 30 so as to be rotatable about a longitudinal axis.

The image recording device 20 can here be coupled to the processing unit 50 of the trolley 30 via plug contacts which form the first communication link 40a, the image recording device 20 being able to be removed from the trolley 30 if necessary and replaced by another image recording device 20.

Except for the different arrangement of the image recording device 20 on the trolley 30, the inspection system 1 shown in FIG. 2 corresponds to the system shown in FIG. 1. In this respect, reference is made to the description of FIG. 1.

Figure 3:
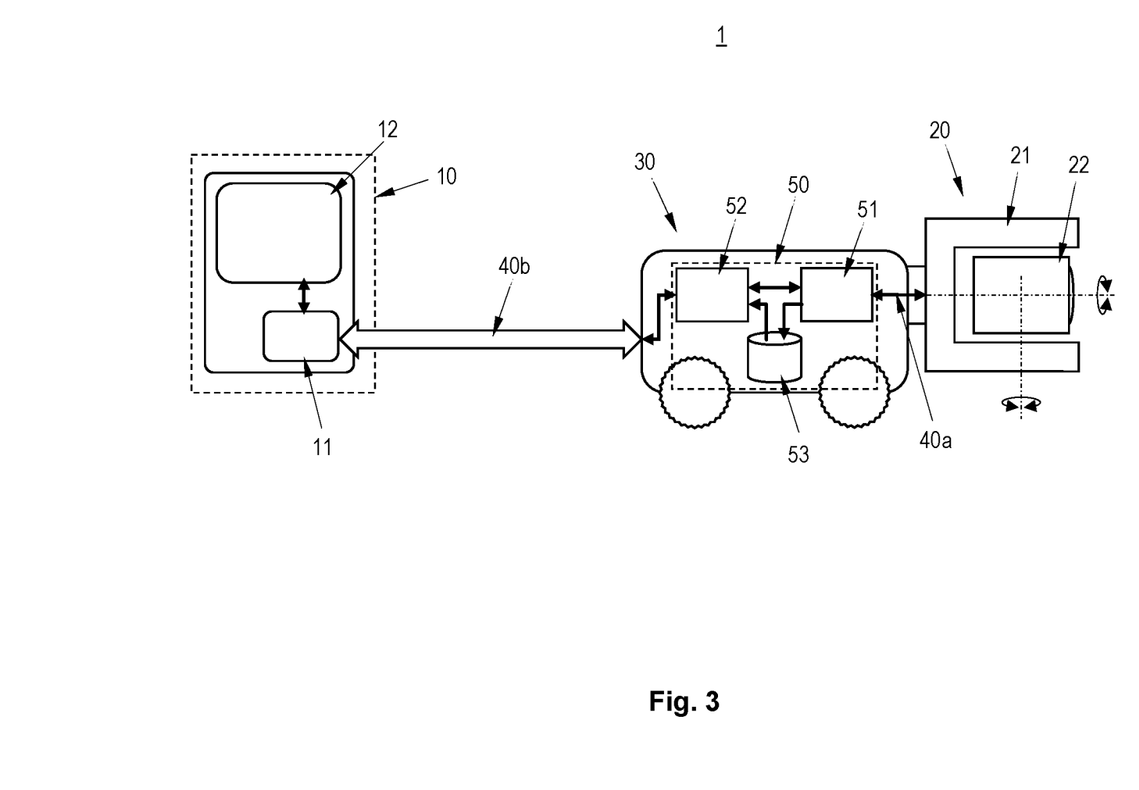
FIG. 3 shows a third embodiment of a pipe inspection and/or maintenance system according to the invention.

FIG. 3 shows a further embodiment of a pipe inspection and/or maintenance system 1 according to the invention. The inspection system shown in FIG. 3 essentially corresponds to the system shown in FIG. 2. In contrast to the system shown in FIG. 2, the control device 10 shown in FIG. 3 has no cable drum 13. The second communication link 40b is directly coupled here to the signal receiving device 11 of the control device 10, which here is part of the display/operating unit 12. In an alternative embodiment, the signal receiving device 11 can also be arranged outside the display/operating unit 12 and can be coupled as a separate unit to the display/operating unit 12.

Otherwise, reference is made to the description of FIGS. 1 and 2.

Figure 4:
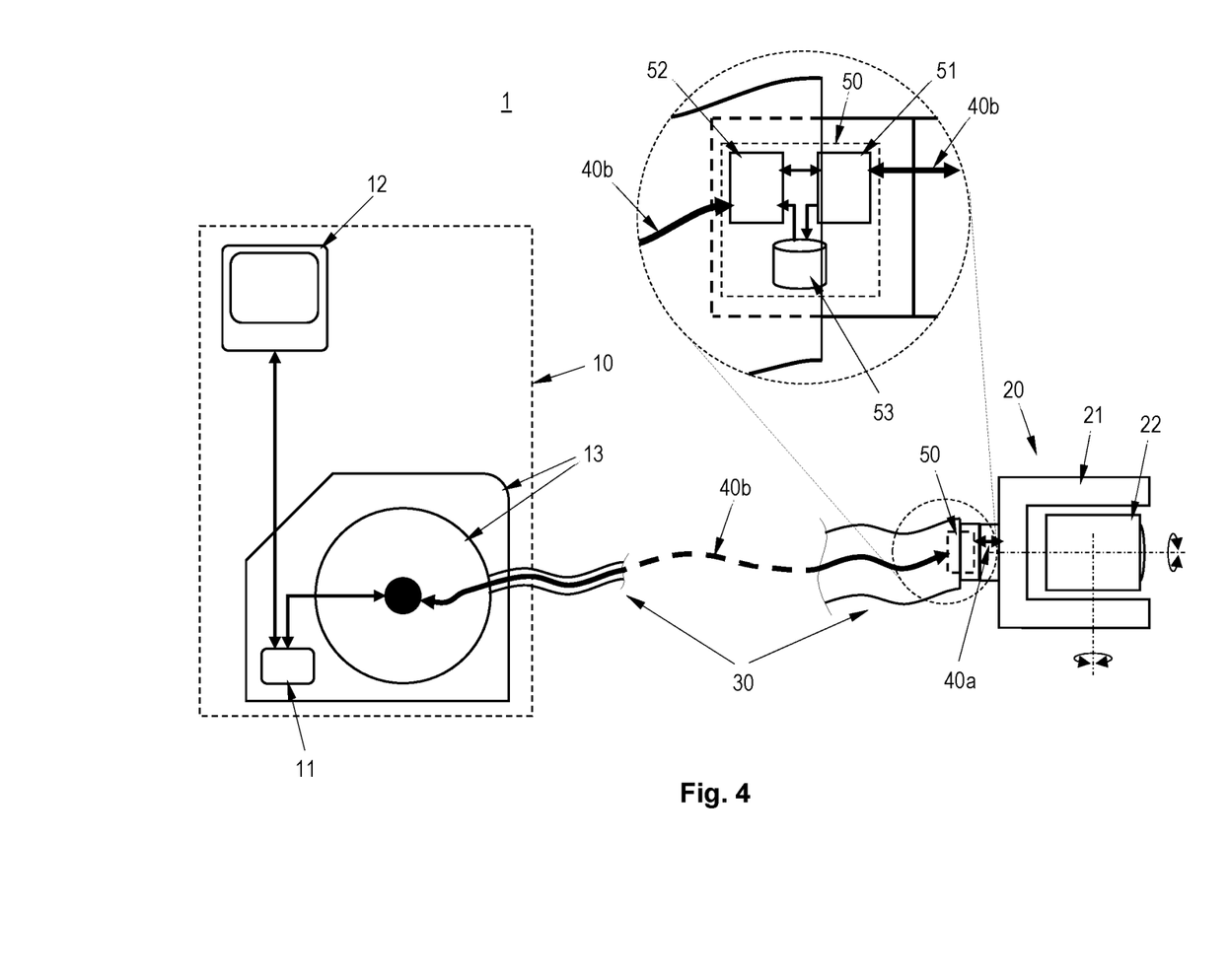
FIG. 4 shows a fourth embodiment of a pipe inspection and/or maintenance system according to the invention.

FIG. 4 shows a further embodiment of a pipe inspection and/or maintenance system 1 according to the invention.

In contrast to the systems shown in FIGS. 1 to 3, the system 1 shown in FIG. 4 has a fiber glass rod 30 as a feed device instead of a trolley. The fiber glass rod 30 can be unwound from or wound onto a cable drum 13. A processing unit 50 is arranged at the free end of the fiber glass rod 30, on which in turn the image recording device 20 is arranged. The image recording device 20 is detachably arranged on the free end of the fiber glass rod 30 or on the processing unit 50, so that the fiber glass rod 30 can also be equipped with different image recording devices 20.

Data or signal lines, which form the second communication link 40b between the processing unit 50 and the control device 10, are arranged in the fiber glass rod 30.

On the control device side, the data or signal lines of the second communication link 40b are coupled to a signal receiving device 11 arranged on the cable drum 13. Alternatively, the signal receiving device 11 can also be a component of the display/operating unit 12 here, so that the data or signal lines of the second communication link 40b can also be coupled directly to the display/operating unit 12.

The processing unit 50 here corresponds to the processing unit 50 shown in FIGS. 1 to 3. The image recording device 20 can be attached to the free end of the fiber glass rod 30 via plug connections which form the first communication link 40a between the processing unit 50 and the image recording device 20.

All of the configurations of a pipe inspection and/or maintenance system 1 according to the invention shown above have the advantage that different camera systems or image recording devices 20 can be arranged on the feed device (trolley or fiber glass rod), since the preparation of the video or image data and its further processing takes place in the signal processing device 51 of the processing unit 50, which is integrated in the feed device 30. As a result of the processing or preparation of the image or video data in the processing unit 50 of the feed device 30, commercially available image recording devices 20 can be used, which can be coupled to the feed device 30 without further adjustments.

With a corresponding design of the signal receiving device 11, different display/operating units 12 can also be used on the control device side, since the signal receiving device 11 takes over the preparation and processing of the received video or image data for the display/operating unit 12.

REFERENCE NUMERALS 1 pipe inspection and/or maintenance system (inspection system, for short)
10 inspection system control device 1
11 signal receiving device of the control device 10
12 display/operating unit of the control device 10
13 cable drum of the control device 10
20 image recording device
21 housing of the image recording device 20
22 camera system or camera of the image recording device 20 (video camera or photo camera, digital or analog)
30 feed device (e.g. trolley or fiber glass rod)
40a first communication link (between the image recording device 20 and the feed device)
40b second communication link (between the control device 10 and the feed device)
50 processing unit of the feed device 30
51 signal processing device of the processing unit 50
52 signal transmission device of the processing unit 50
53 storage device of the processing unit 50

The invention claimed is:

1. A pipe inspection and/or maintenance system (1) for the inspection and/or maintenance of a pipe, comprising a control device (10), an image recording device (20) and a feed device (30), wherein
the image recording device (20) can be coupled mechanically, detachably, to the feed device (30) in order to move the image recording device (20) in the pipe with the feed device (30),
the image recording device (20) and the feed device (30) are operatively connected to one another via a first communication link (40a),
the feed device (30) and the control device (10) are operatively connected to one another via a second communication link (40b),
the feed device (30) has a processing unit (50) which is operatively connected to the first communication link (40a) and to the second communication link (40b) and arranged in the feed device (30), the processing unit (50) being adapted,
to receive image data from the image recording device (20) via the first communication link (40a),
to process the received image data, and
to transmit the processed image data to the control device (10) via the second communication link (40b), and wherein
the processing unit (50) has at least one signal processing device (51) and a signal transmission device (52) operatively connected thereto, wherein
the system processing device (51) is adapted to receive the image data of the image recording device (20), to process the received image data, and to transmit the processed image data to the signal transmission device (52), and
the signal transmission device (52) is adapted to transmit the image data received by the signal processing device (51) to the control device (10), and
the feed device (30) is a trolley, and wherein:
the control device (10) comprises a signal receiving device (11) and a display/operating unit (12), the signal receiving device (11) being coupled to and adapted to the second communication link (40b)
to receive the image data from the signal transmission device (52), and
to process the received image data and prepare it for display on the display/operating unit (12),
the control device (10) further comprises a cable drum (13) on which the signal receiving device (11) is arranged,
the signal receiving device (11) is coupled to a cable wound on the cable drum,
the signal receiving device (11) is coupled to the display/operating unit (12), and
wherein
the signal receiving device (11) is adapted to receive the image data and to process the image data before transmission of the image data to the display/operating unit (12),
wherein processing the image data received from the signal processing device comprises:
digitization of analog image data received and compression of the digitized image data, or
compression of digitally received image data,
wherein the signal processing device has a compression unit for compressing the image data, and
wherein the signal transmission device is adapted to transmit the digitized and compressed image data according to a predetermined transmission standard to the control device, the signal processing device or the signal transmission device being further adapted to prepare the digitized and compressed image data in accordance with the predetermined transmission standard.

2. The system of claim 1, wherein the second communication link (40b) is at least in sections a copper cable or a fiber optic cable.

3. The system of claim 1, wherein the predetermined transmission standard is, BroadR-Reach.

4. A method for data transmission in a pipe inspection and/or maintenance system (1), the pipe inspection and/or maintenance system (1) having at least one control device (10), an image recording device (20) and a feed device (30), wherein
image data recorded by the image recording device (20) is transmitted from the image recording device (20) to the feed device (30) via a first communication link (40a),
a processing unit (50) of the feed device (30)
processes the received image data, and
transmits the processed image data to the control device (10) via a second communication link (40b),
a signal processing device (51) of the processing unit (50) receives the image data from the image recording device (20), processes the received image data and transmits the processed image data to a signal transmission device (52) of the processing unit (50), and
the signal transmission device (52) transmits the image data received from the signal processing device (51) to the control device (10),
the image recording device (20) and the feed device (30) being releasably coupled to one another, and wherein the feed device (30) is a trolley, and wherein:
a signal receiving device (11) of the control device (10) receives the image data from the signal transmission device (52) and processes the received image data for display on a display/control unit (12) control device (10),
the control device (10) further comprises a cable drum (13) on which the signal receiving device (11) is arranged,
the signal receiving device (11) is coupled to a cable wound on the ca-ble drum,
the signal receiving device (11) processes the image data before trans-mitting the image data to the display/operating unit (12),
wherein during processing of the image data received from the signal processing device:
received analog image data is digitized and the digitized image data is compressed, or
received digital image data is compressed, and
wherein the signal transmission device transmits the digitized and compressed image data to the control device in accordance with a predetermined transmission standard, the signal processing device or the signal transmission device being further adapted to prepare the digitized and compressed image data in accordance with the predetermined transmission standard.

5. The method of claim 4, wherein the a predetermined transmission standard is BroadR-Reach.

* * * * *